(12) United States Patent
Kanehara et al.

(10) Patent No.: US 11,144,073 B2
(45) Date of Patent: Oct. 12, 2021

(54) INFORMATION COLLECTION SYSTEM AND SERVER APPARATUS

(71) Applicant: Toyota Jidosha Kabushiki Kaisha, Toyota (JP)

(72) Inventors: Isao Kanehara, Miyoshi (JP); Kazuhiro Umeda, Nisshin (JP); Hideo Hasegawa, Nagoya (JP); Tsuyoshi Okada, Toyota (JP); Shinjiro Nagasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 16/227,818

(22) Filed: Dec. 20, 2018

(65) Prior Publication Data

US 2019/0196514 A1 Jun. 27, 2019

(30) Foreign Application Priority Data

Dec. 25, 2017 (JP) .............................. JP2017-248007

(51) Int. Cl.
*G05D 1/12* (2006.01)
*G05D 1/00* (2006.01)
(Continued)

(52) U.S. Cl.
CPC .............. *G05D 1/12* (2013.01); *B64C 39/024* (2013.01); *G05D 1/0027* (2013.01);
(Continued)

(58) Field of Classification Search
CPC ...... G05D 1/0094; G05D 1/00; G05D 1/0088; G05D 1/0231; A62C 31/00;
(Continued)

(56) References Cited

U.S. PATENT DOCUMENTS 8,078,319 B2 * 12/2011 Franke ................. G05D 1/0088
700/248
9,307,383 B1 * 4/2016 Patrick .................... H04W 4/90
(Continued)

FOREIGN PATENT DOCUMENTS

| CN | 105243851 A | 1/2016 |
|---|---|---|
| CN | 105717946 A | 6/2016 |
| CN | 106656310 A | 5/2017 |
| JP | 2015092320 A | 5/2015 |
| JP | 2016181239 A | 10/2016 |
| JP | 2017-182454 A | 10/2017 |

*Primary Examiner* — Ig T An
(74) *Attorney, Agent, or Firm* — Dinsmore & Shohl LLP

(57) ABSTRACT

An autonomous mobile object includes an imaging unit, a positional information sender to acquire and send positional information to a server, and an operation controller to cause the autonomous mobile object to move autonomously based on an operation command. The server includes storage to receive and store the positional information from the autonomous mobile object, a commander to send the operation command to the autonomous mobile object, and a receiver to receive information relating to an emergency report including a target location. When the receiver receives the information relating to the emergency report, the commander sends an emergency operation command to the autonomous mobile object located in a specific area including the target location. The emergency operation command causes the autonomous mobile object to capture an image of a person or a vehicle moving away from the target location, and the autonomous mobile object sends the image to the server.

8 Claims, 9 Drawing Sheets

(51) Int. Cl.
  *B64C 39/02*   (2006.01)
  *G06K 9/00*    (2006.01)
  *G05D 1/02*    (2020.01)

(52) U.S. Cl.
  CPC ......... *G05D 1/0088* (2013.01); *G05D 1/0094* (2013.01); *G05D 1/0231* (2013.01); *G05D 1/0297* (2013.01); *G06K 9/00791* (2013.01); *B64C 2201/127* (2013.01); *B64C 2201/141* (2013.01); *G05D 2201/0213* (2013.01)

(58) Field of Classification Search
  CPC .......... G06K 9/00791; B60K 2370/175; B61L 2210/02; B64C 2201/141; G05B 2219/32388; G05B 2219/50393
  See application file for complete search history.

(56) References Cited

U.S. PATENT DOCUMENTS

| | | | | |
|---|---|---|---|---|
| 9,820,120 | B2* | 11/2017 | deCharms | H04L 65/1059 |
| 9,905,133 | B1* | 2/2018 | Kumar | G08G 1/202 |
| 10,380,694 | B1* | 8/2019 | Grant | G08G 1/205 |
| 2015/0148988 | A1* | 5/2015 | Fleck | B64D 1/14 |
| | | | | 701/2 |
| 2015/0205298 | A1* | 7/2015 | Stoschek | B60L 50/60 |
| | | | | 701/23 |
| 2019/0329421 | A1* | 10/2019 | Deyle | B25J 11/008 |

* cited by examiner

INFORMATION COLLECTION SYSTEM AND SERVER APPARATUS

CROSS REFERENCE TO RELATED APPLICATION

This application claims priority to Japanese Patent Application No. 2017-248007 filed on Dec. 25, 2017, incorporated herein by reference in its entirety.

BACKGROUND

Technical Field

The present disclosure relates to a system that collects information using mobile objects.

Description of the Related Art

There have been developed systems that perform surveillance over an area using mobile objects. For example, Japanese Patent Application Laid-Open No. 2016-181239 discloses a system that collects images using terminals provided in mobile objects to create a virtual surveillance network.

Various studies have been performed on development of services using mobile objects that are capable of moving autonomously. For example, Japanese Patent Application Laid-open No. 2015-092320 discloses a traffic system for transportation of passengers and goods that dispatches autonomous vehicles on users' demand.

Vehicles described in Japanese Patent Application Laid-Open No. 2015-092320 can be used as the mobile objects described in Japanese Patent Application Laid-Open No. 2016-181239 to construct a system that is capable of collecting an increased amount of information.

SUMMARY OF THE DISCLOSURE

While the system disclosed in No. 2016-181239 can perform surveillance of an area by collecting images, it is not suitable for the purpose of collecting information in cases, for example, where a crime occurs. For example, when the occurrence of a crime or a suspicious person is reported, the system disclosed in No. 2016-181239 can extract images around the site of the reported event from the images that have been collected previously, after the occurrence of the event. However, the system cannot capture images around the site of the reported event preponderantly.

The present disclosure has been made to solve the above problem. An object of the present disclosure is to enable initial actions to be taken in response to a report by using autonomous mobile objects.

An information collection system according to the present disclosure is a system including an autonomous mobile object and a server apparatus.

Specifically, the autonomous mobile object has an imaging unit configured to capture an image, a positional information sender configured to acquire positional information and send it to the server apparatus, and an operation controller configured to cause the autonomous mobile object to move autonomously on the basis of an operation command. The server apparatus has a storage unit configured to receive the positional information from the autonomous mobile object, and store it, a commander configured to send the operation command to the autonomous mobile object, and a receiver configured to receive information relating to an emergency report including information about a target location. When the receiver of the server apparatus receives the information relating to the emergency report, the commander sends an emergency operation command to the autonomous mobile object that is located in a specific area including the target location. The emergency operation command is a command that causes the autonomous mobile object to capture an image of a person or a vehicle that is moving in a direction away from the target location, and the autonomous mobile object sends the image captured according to the emergency operation command to the server apparatus.

The autonomous mobile object is a mobile object that moves autonomously on the basis of a certain operation command. The autonomous mobile object may be an autonomous vehicle. The operation command is information including, for example, information about a destination and/or a travel route and information about a service to be provided by the autonomous mobile object on the route. For example, in the case where the autonomous mobile object is intended for transportation of passengers and/or goods, the operation command may be a command that causes the autonomous mobile object to transport passengers and/or goods along a predetermined route. In the case where the autonomous mobile object is intended for transportation of a shop, facility, or equipment, the operation command may be a command that causes the autonomous mobile object to travel to a certain destination, and prepare the shop, facility, or equipment for service at that place.

The autonomous mobile object has means for capturing images and means for sending positional information to the server apparatus.

The server apparatus is an apparatus that performs management of the autonomous mobile objects.

The server apparatus sends operation commands to the autonomous mobile objects and stores the positional information received from the autonomous mobile objects. When the server apparatus receives information relating to an emergency report, it sends an emergency operation command to an autonomous mobile object(s) that is located in a specific area around the target location. Examples of the emergency report include a report of the occurrence of a crime or accident and a report of observation of a suspicious person or a suspicious vehicle, and the emergency report relates to a certain location. According to the emergency operation command, the autonomous mobile object captures an image(s) of a person or vehicle that is moving in a direction away from the target location. For this purpose, the autonomous mobile object may move closer to the target location.

Thus, it is possible to collect information using an autonomous mobile object(s) under operation. Therefore, it is possible to know the circumstances of the site at which the emergency report has been made, enabling proper initial actions to be taken.

Further, if the autonomous mobile object receives the emergency operation command while operating on the basis of a first operation command, the autonomous mobile object may suspend the operation based on the first operation command.

In the case where the autonomous mobile object has an operation command under execution at the time when it receives the emergency operation command, in some embodiments the autonomous mobile object suspends the operation and moves to a designated location.

The emergency report may be a report of a suspicious person or a suspicious vehicle. The emergency operation command may include information about features of the suspicious person or the suspicious vehicle, and the autonomous mobile object may detect an object having the features.

Provided with information about features of a target object such as a person or vehicle (e.g. facial features, clothes, the model, color and/or license plate of the vehicle), the autonomous mobile object is expected to be able to detect the target object. The result of detection may be sent to the server apparatus with an image(s).

Further, the autonomous mobile object may be provided with an aircraft having a camera and pursue the object using the aircraft.

For example, the autonomous mobile object may be provided with a small-size, battery-powered unmanned aircraft, which may be used to pursue a target object. This enables pursuit to be carried out without being affected by traffic conditions.

Further, when a remaining flight time of the aircraft becomes smaller than a predetermined length of time, a second autonomous mobile object other than the autonomous mobile object may take over the pursuit, and a second aircraft that the second autonomous mobile object has may continue the pursuit.

Cooperation of a plurality of autonomous mobile objects enables pursuit of the same target object by different air crafts provided in the different autonomous mobile objects. Thus, if pursuit can be taken over, pursuit can be continued regardless of the remaining battery capacity of the aircrafts.

Further, the autonomous mobile object may set the location at which the object having the features is detected as an updated target location and shares information about the updated target location with another autonomous mobile object.

Accuracy of pursuit can be improved by setting a location at which the target object is detected as an updated target location and sharing the information about the updated target location with another autonomous mobile object present in the neighborhood. The information about the target location may be shared through either inter-vehicle communication or communication via the server apparatus.

Further, the emergency operation command may be a command that invites two or more autonomous mobile objects respectively to locations in different paths that start from the target location.

This mode can increase the probability of capturing an image of an object moving away from the target location.

Further, the autonomous mobile object may send the image to the server apparatus on a real-time basis while operating on the basis of the emergency operation command.

In this mode, the autonomous mobile object can be used as a surveillance camera that moves on a real-time basis.

A server apparatus according to the present disclosure is a server apparatus that communicates with an autonomous mobile object that has an imaging unit and moves autonomously on the basis of an operation command, comprising a storage unit configured to receive positional information from the autonomous mobile object and store it, a commander configured to send the operation command to the autonomous mobile object, and a receiver configured to receive information relating to an emergency report including information about a target location, wherein when the receiver receives the information relating to an emergency report, the commander sends an emergency operation command to the autonomous mobile object that is located in a specific area including the target location, the emergency operation command being a command that causes the autonomous mobile object to capture an image of a person or a vehicle that is moving in a direction away from the target location.

According to the present disclosure, there can also be provided an information collection system or a server apparatus including at least one or more of the above-described means. According to another aspect of the present disclosure, there is provided a method carried out by the above-described information collection system or the server apparatus. The processing and means described above may be employed in any combinations, as far as it is technically feasible.

As described above, the present disclosure enables initial actions to be taken using an autonomous mobile object in response to a report.

DESCRIPTION OF THE EMBODIMENTS

First Embodiment

<System Configuration>

Figure 1:
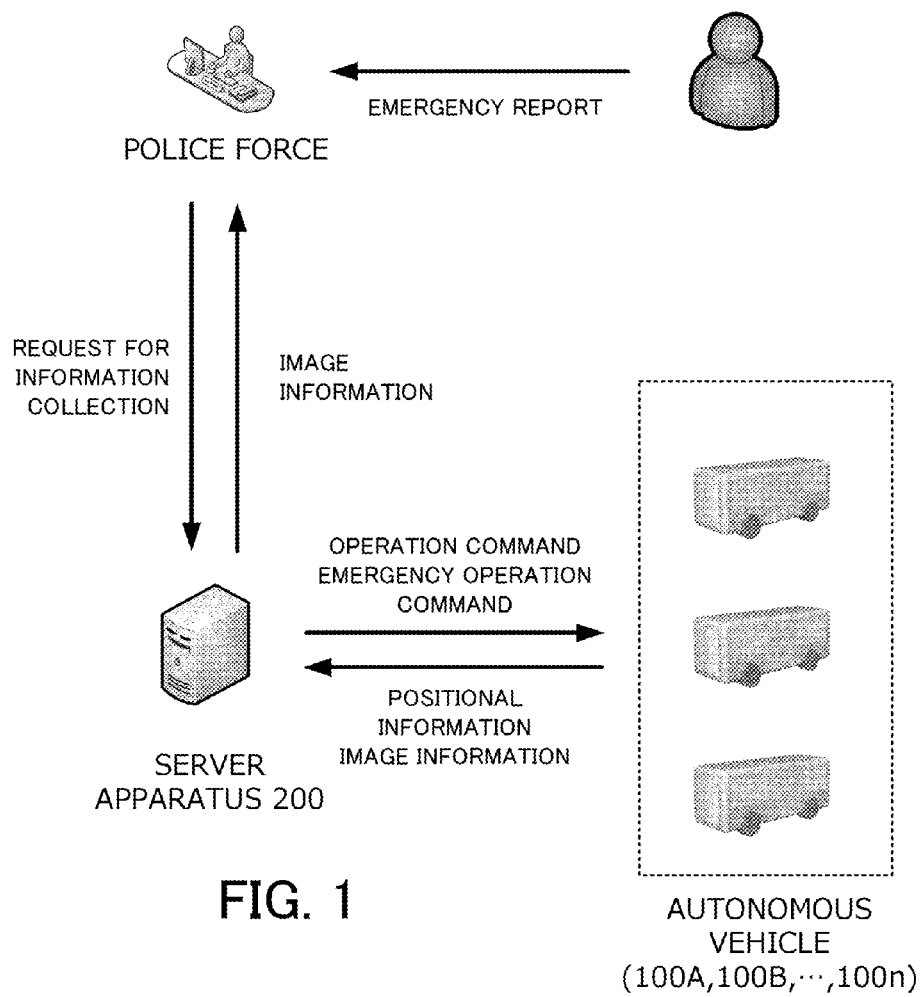
FIG. 1 snows the basic system configuration of an information collection system according to a first embodiment.

The general configuration of an information collection system according to a first embodiment will be described with reference to FIG. 1. The information collection system according to the first embodiment includes a plurality of autonomous vehicles 100A, 100B, . . . 100n that can run autonomously on the basis of commands given thereto and a server apparatus 200 that sends the commands. The autonomous vehicle 100 is a self-driving vehicle that provides a predetermined service. The server apparatus 200 is an apparatus that performs management of the plurality of autonomous vehicles 100. In the following, the plurality of autonomous vehicles will be collectively referred to as autonomous vehicles 100, when it is not necessary to distinguish individual vehicles.

The autonomous vehicles 100 are multipurpose mobile objects that may individually have different functions and can travel on the road autonomously without a human driver. Examples of the autonomous vehicles 100 include vehicles that travel along a predetermined route to pick up and drop off persons, on-demand taxis that operate on users' demand, and mobile shops that enable shop operation at a desired destination. In the case where the autonomous vehicles 100 are intended for transportation of passengers and/or goods, they may transport passengers and/or goods along a predetermined route. In the case where the autonomous vehicles 100 are intended for transportation of a shop, facility, or equipment, they may travel to a destination, and the shop, facility, or equipment may be prepared for operation at that place. The autonomous vehicles 100 may be vehicles that patrol on the road for the purpose of monitoring facilities and/or infrastructures or preventing crimes. In that case, the autonomous vehicles 100 may be configured to travel along a predetermined patrol route. The autonomous vehicles 100 are also called as electric vehicle palettes (EV palettes).

The autonomous vehicles 100 are not required to be vehicles without humans. For example, a sales staff(s), a customer service attendant(s), or an operation monitoring crew may be on board. The autonomous vehicles 100 are not required to be vehicles that can run completely autonomously. For example, they may be vehicles that can be driven by a human driver or accept a human assistance in some circumstances.

Moreover, the autonomous vehicles 100 have the functions of accepting requests by users, responding to the users, performing appropriate processing in response to the users' requests, and reporting the result of processing to the users. The autonomous vehicles 100 may transfer the requests by users that they cannot fulfil by themselves to the server apparatus 200 so as to fulfil them in cooperation with the server 200.

The server apparatus 200 is an apparatus that directs the operation of the autonomous vehicles 100. In the case where the autonomous vehicles 100 are on-demand taxis, the server apparatus 200 receives a request by a user to get a location to which an autonomous vehicle 100 is to be dispatched and the user's destination. Then, the server apparatus 200 sends to art autonomous vehicle 100 that is running in the neighborhood of the requested location a command to the effect that the autonomous vehicle 100 is to transport a person(s) from the place of departure to the destination. This command can cause the autonomous vehicle 100 to travel along a specific route. The operation commands are not limited to commands that cause an autonomous vehicle to travel from a place of departure to a destination. Examples of other operation commands may include a command that causes an autonomous vehicle 100 to travel to a determined destination to open a shop at that place and a command that causes an autonomous vehicle 100 to survey streets while traveling along a determined route. As described above, operation commands may specify operations to be done by autonomous vehicles 100 besides traveling.

Besides the above-described functions, the server apparatus 200 of the information collection system according to this embodiment has the function of collecting images using the autonomous vehicles 100, when it is requested by a police force to do so in cases where a report (e.g. a report of a suspicious person or a suspicious vehicle or a report of the occurrence of a crime, or an accident) is made to the police force. For example, the server apparatus 200 acquires information about the location at which an event is reported, then finds an autonomous vehicle(s) 100 running in the neighborhood of that location, and causes the autonomous vehicle(s) 100 to capture images of a person(s) and/or a vehicle(s) that is moving in a direction away from, the reported location.

This helps the police force to know the circumstances and the location of the reported person (a suspect or a related person) or the reported vehicle (a suspicious vehicle or a related vehicle) soon.

The police force, mentioned above is an exemplary agency, which may be replaced by other agencies, such as a security company.

<System Configuration>

In the following, the elements of the system will be described in detail.

Figure 2:
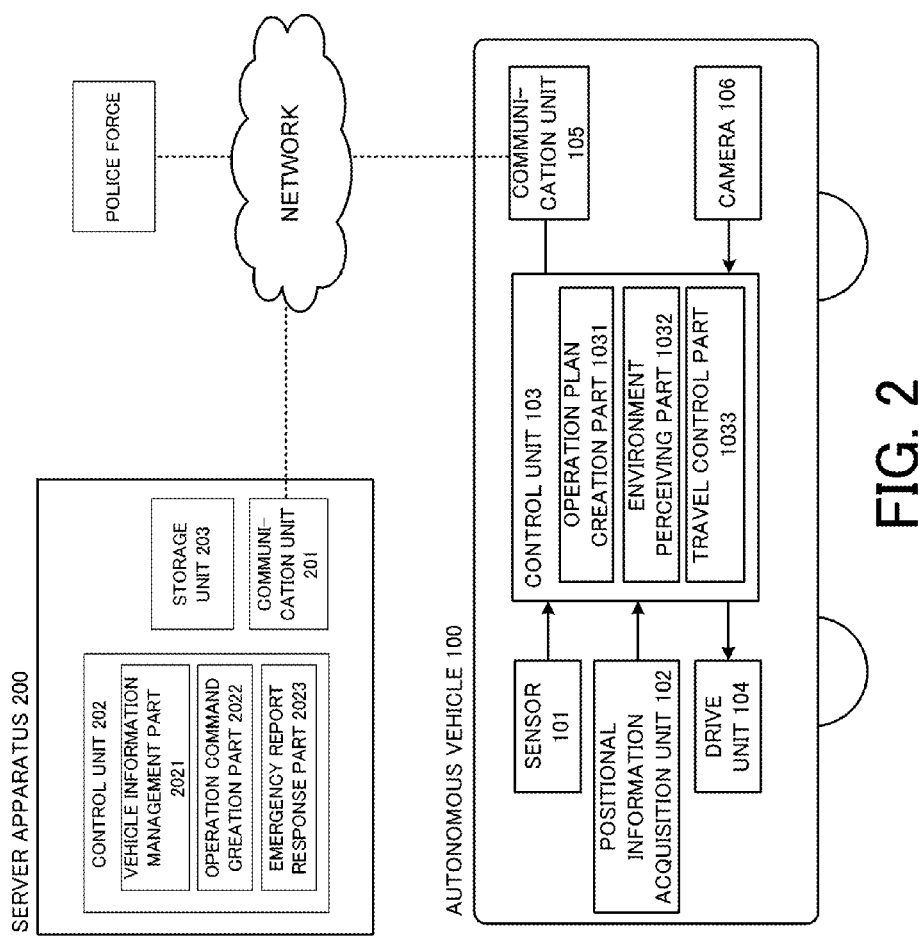
FIG. 2 is a block diagram showing exemplary elements of the information collection system.

FIG. 2 is a block diagram showing an example of the configuration of the autonomous vehicle 100 and the server apparatus 200 shown in FIG. 1. The system may include a plurality of autonomous vehicles 100.

The autonomous vehicle 100 is a vehicle that runs according to a command received from the server apparatus 200. Specifically, the autonomous vehicle 100 creates a traveling route on the basis of the operation command received by wireless communication and travels on the road in an appropriate manner while sensing the environment of the vehicle.

The autonomous vehicle 100 has a sensor 101, a positional information acquisition unit 102, a control unit 103, a driving unit 104, and a communication unit 105. The autonomous vehicle 100 operates by electrical power supplied by a battery.

The sensor 101 is a means for sensing the environment of the vehicle, which typically includes a stereo camera, a laser scanner, LiDAR, radar, or the like. Information acquired by the sensor 101 is sent to the control unit 103.

The positional information acquisition unit 102 is means for acquiring the current position of the vehicle, which typically includes a GPS receiver. Information acquired by the positional information acquisition unit 102 is sent to the control unit 103.

The control unit 103 is a computer that controls the autonomous vehicle 100 on the basis of the information acquired through the sensor 101. The control unit 103 is, for example, a microcomputer.

The control unit 103 includes as functional modules an operation plan creation part 1031, an environment perceiving part 1032, and a travel control part 1033. These functional modules may be implemented by executing programs stored in the storage, such as a read only memory (ROM), by a central processing unit (CPU).

The operation plan creation part 1031 receives an operation command from the server apparatus 200 and creates an operation plan of the vehicle. In this embodiment, the operation plan is data that specifies a route along which the autonomous vehicle 100 is to travel and a task(s) to be done by the autonomous vehicle 100 during a part or the entirety of that route. Examples of data included in the operation plan are as follows.

(1) Data that specifies a route along which the vehicle is to travel by a set of road links.

The route along which the vehicle is to travel may be created automatically from a given place of departure and a given destination with reference to map data stored in the storage. Alternatively, the route may be created using an external service.

(2) Data specifying a task(s) to be done by the vehicle at a certain location(s) in the route.

Examples of the tasks to be done by the vehicle include, but are not limited to, picking up or dropping off a person(s), loading or unloading goods, opening and closing a mobile shop, and collecting data.

The operation plan created by the operation plan creation part 1031 is sent to the travel control part 1033, which will be described later.

The environment perceiving part 1032 perceives the environment around the vehicle using the data acquired by the sensor 101. What is perceived includes, but is not limited to, the number and the position of lanes, the number and the position of other vehicles present around the vehicle, the number and the position of obstacles (e.g. pedestrians, bicycles, structures, and buildings), the structure of the road, and road signs. What is perceived may include anything that is useful for autonomous traveling.

The environment perceiving part 1032 may track a perceived object(s). For example, the environment perceiving part 1032 may calculate the relative speed of the object from the difference between the coordinates of the object determined in a previous step and the current coordinates of the object.

The data relating to the environment acquired by the environment perceiving part 1032 is sent to the travel control part 1033, which will be described below. This data will be hereinafter referred to as "environment data".

The travel control part 1033 controls the traveling of the vehicle on the basis of the operation plan created by the operation plan creation part 1031, the environment data acquired by the environment perceiving part 1032, and the positional information of the vehicle acquired by the positional information acquisition unit 102. For example, the travel control part 1033 causes the vehicle to travel along a predetermined route in such a way that obstacles will not enter a specific safety zone around the vehicle, A known autonomous driving method may be employed to drive the vehicle.

The driving unit 104 is means for driving the autonomous vehicle 100 according to a command issued by the travel control part 1033. The driving unit 104 includes, for example, a motor and inverter for driving wheels, a brake, a steering system, and a secondary battery.

The communication unit 105 serves as communication means for connecting the autonomous vehicle 100 to a network. In this embodiment, the communication unit can communicate with another device (e.g. the server apparatus 200) via a network using a mobile communication service based on e.g. 3G or LTE.

The communication unit 105 may further have communication means for inter-vehicle communication with other autonomous vehicles 100.

Figure 3:
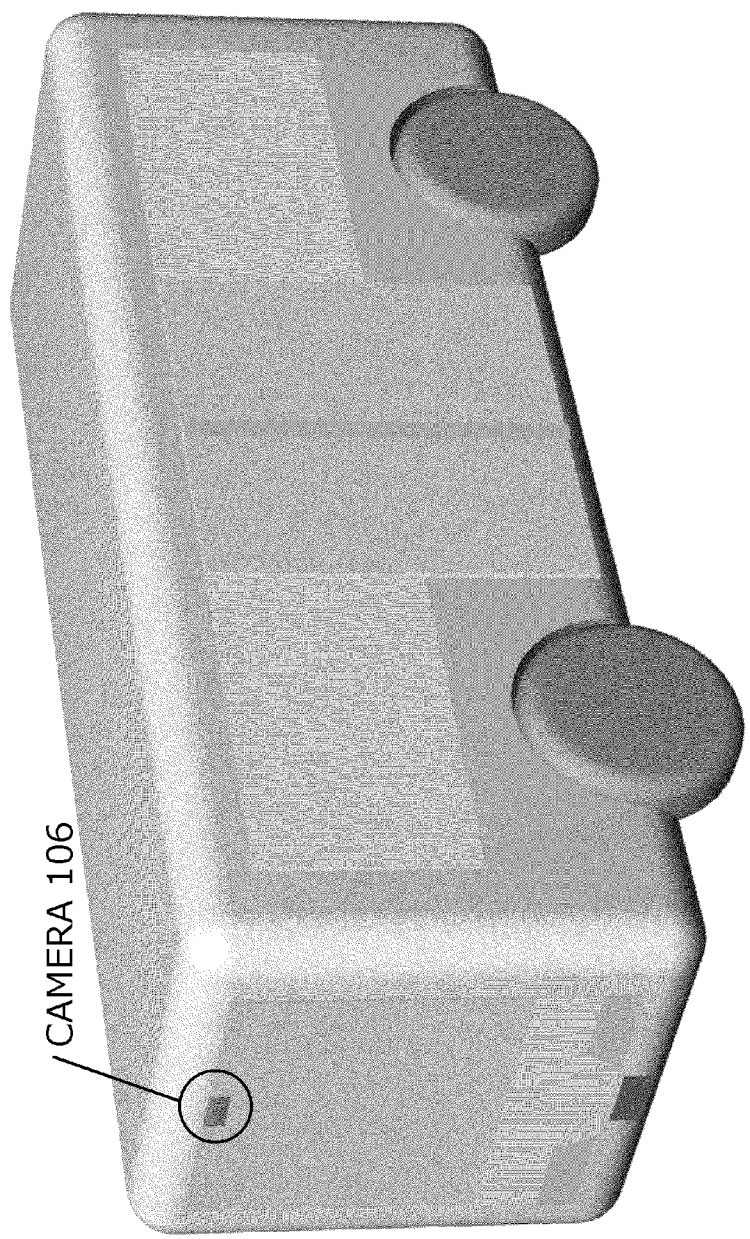
FIG. 3 shows the outer appearance of an autonomous vehicle 100.

The autonomous vehicle 100 has a camera 106 provided on its body. The camera 106 is an imaging device using an image sensor such as a charge-coupled device (CCD) metal oxide semiconductor (MOS), or complementary metal oxide semiconductor (CMOS) sensor. FIG. 3 shows the outer appearance of the autonomous vehicle 100. As shown in FIG. 3, the autonomous vehicle 100 according to this embodiment has the on-vehicle camera 106, which can capture images (still images or moving images). The camera 106 may be any kind of camera that can capture images of a person(s) or a vehicle(s) to be monitored. For example, the camera 106 may be a visible light camera or an infrared camera. While FIG. 3 shows only one camera 106, the autonomous vehicle 100 may have a plurality of cameras 106 provided on different portions of the vehicle body. For example, cameras 106 may be provided on the front, rear, and right and left sides of the vehicle body.

In the following, a person or a vehicle that is an object of image capturing by the autonomous vehicle 100 according to this embodiment will be referred to as a "target person", "target vehicle", or simply "target", Now, the server apparatus 200 will be described.

The server apparatus 200 is configured to manage the position of the running autonomous vehicles 100 and send operation commands. For example, in the case where the server apparatus 200 receives from a user a request for dispatch of a taxi, the server apparatus 200 acquires the location of departure and the destination and sends an operation command to an autonomous vehicle 100 that is running in the neighborhood of the place of departure and capable of serving as a taxi.

The server apparatus 200 has a communication unit 201, a control unit 202, and a storage unit 203.

The communication unit 201 is, as with the above-described communication unit 105, a communication interface for communication with autonomous vehicles 100 via a network.

The control unit 202 is means for controlling the server apparatus 200. The control unit 202 is constituted by, for example, a CPU.

The control unit 202 includes as functional modules a vehicle information management part 2021, an operation command creation part 2022, and an emergency report response part 2023. These functional modules may be implemented by executing programs stored in storage means, such as a read only memory (ROM).

The vehicle information management part 2021 manages a plurality of autonomous vehicles 100 that are under its management. Specifically, the vehicle information management part 2021 receives positional information from the plurality of autonomous vehicles 100 at predetermined intervals and stores the information in association with the date and time in the storage unit 203, which will be described later. Moreover, the vehicle information management part 2021 holds and updates data about characteristics of the autonomous vehicles 100, if necessary. This data will be hereinafter referred to as "vehicle information". Examples of the vehicle information include, but are not limited to, the identification of each autonomous vehicle 100, the service type, information about the location at which each vehicle is on standby (e.g. car shed or service office), the door type, the vehicle body size, the carrying capacity, the maximum number of passengers, the full charge driving range, the present (or remaining) driving range, and the present status (such as empty, occupied, running, or under operation etc.).

When a request for dispatch of an autonomous vehicle 100 is received from outside, the operation command creation part 2022 determines the autonomous vehicle 100 to be dispatched and creates an operation command according to the vehicle dispatch request. Examples of the vehicle dispatch request are, but not limited to, as follows:

(1) Request for Transportation of Passengers or Goods

This is a request for transportation of a passenger(s) or goods with designation of a place of departure and a destination or a route to be followed.

(2) Request for Dispatch of an Autonomous Vehicle Having a Specific Function

This is a request for dispatch of an autonomous vehicle 100 that has a specific function, such as the function as a shop (e.g. eating house, sales booth, or showcase), an office of a business entity (e.g. private office or service office), or a public facility (e.g. branch of a city office, library, or clinic). The place to which an autonomous vehicle is to be dispatched may be either a single place or multiple places. In the case of multiple places, service may be provided at each of the places.

(3) Request for Patrol on the Road

This is a request for patrol on the road for the purpose of monitoring facilities and/or infrastructures or preventing crimes.

Vehicle dispatch requests are received from users via, for example, a network. The sender of a vehicle dispatch request is not necessarily an ordinary user. For example, the organization that provides the service with the autonomous vehicles 100 may send a vehicle dispatch request.

The autonomous vehicle 100 to which an operation command is to be sent is determined taking account of the positional information of the vehicles and the vehicle information (indicating what function each vehicle has) that the vehicle information management part 2021 has received.

The emergency report response part 2023 sends to an autonomous vehicle 100 that is operating according to an operation command it has received a further operation command based on an emergency report.

Specifically, in response to a request for information collection (information collection request) sent by a police force that has received an emergency report, an autonomous vehicle(s) 100 that is running in the neighborhood of the place related to the emergency report is dispatched to a specific location so as to capture images. Such an operation command based on an emergency report will be referred to as an "emergency operation command" hereinafter.

The autonomous vehicle 100 that has received an emergency operation command suspends its operation and performs an operation based on the emergency operation command. This operation will be hereinafter referred to as "emergency operation". Details of the emergency operation will be described later.

The storage unit 203 is means for storing information, which is constituted by a storage medium such as a RAM, a magnetic disc, or a flash memory.

<Operations under Normal Circumstances>

Figure 4:
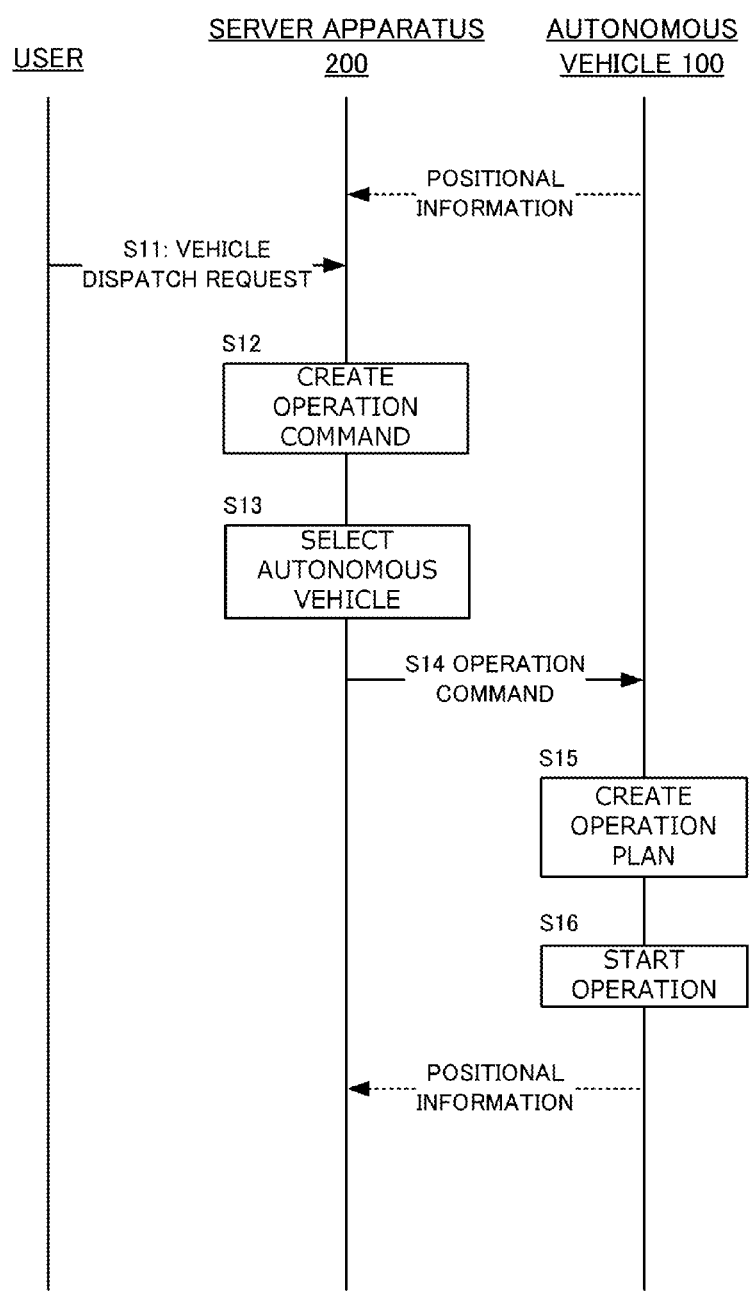
FIG. 4 is a diagram showing dataflow between elements of the system.

Processing that is performed by each of the above-described components will now be described. FIG. 4 is a diagram illustrating dataflow during the process in which the server apparatus 200 creates an operation command based on a request by a user and an autonomous vehicle 100 starts to operate. Here, a case in which the autonomous vehicle 100 runs in a road network shown in FIG. 5 will be described by way of example.

The autonomous vehicle 100 sends positional information periodically to the server apparatus 200. For example, in the case shown in FIG. 5, the autonomous vehicle 100 informs the server apparatus 200 of its location at node A, and the vehicle information management part 2021 stores the association of the autonomous vehicle 100 with node A as data in the storage unit 203. The positional information is not necessarily positional information of a node itself. For example, the positional information may be information that specifies a node or link. A link may be divided into a plurality of sections. The road network is not necessarily a network represented by nodes and links. The positional information is updated every time the autonomous vehicle 100 moves.

If a user sends a vehicle dispatch request to the server apparatus 200 by communication means (step S11), the server apparatus 200 (specifically, the operation command creation part 2022) creates an operation command according to the vehicle dispatch request (step S12). The operation command may designate a place of departure and a destination or only a destination. Alternatively, the operation command may designate a travel route. The operation command may include information about a task to be done or a service to be provided on the route. Here, a case in which a request for transportation of a person from node B to node C is made will be described.

Figure 5:
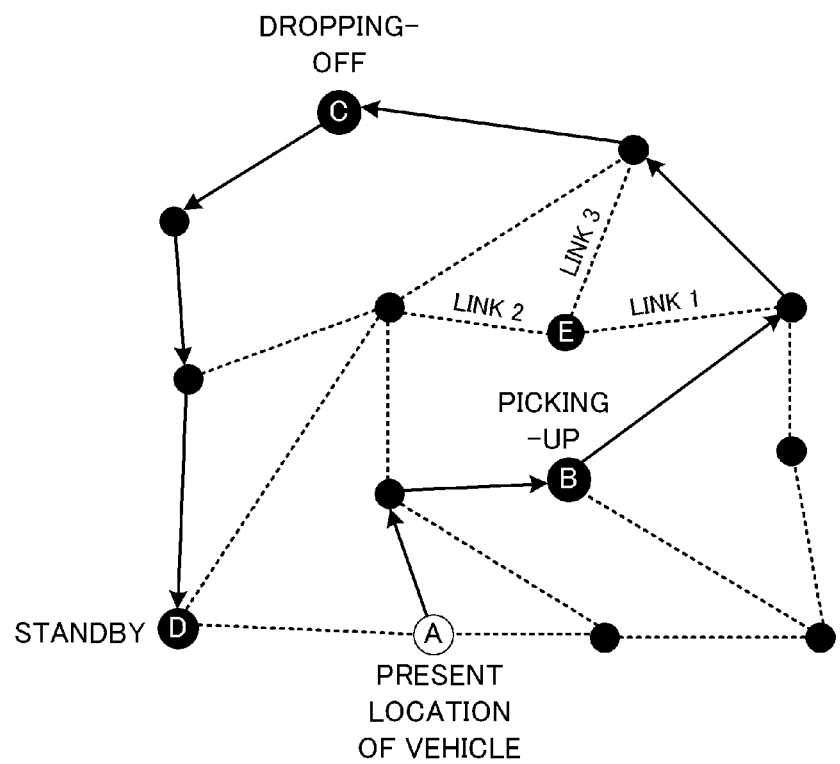
FIG. 5 is a diagram showing an exemplary road network.

In step S13, the operation command creation part 2022 selects an autonomous vehicle 100 that is to provide the service. For example, the operation command creation part 2022 determines an autonomous vehicle 100 that can provide the requested service and can be delivered to the user within a predetermined time, with reference to the stored positional information and vehicle information of the autonomous vehicles 100. Here, let us assume that the vehicle located at node A in FIG. 5 is selected. Consequently, the server apparatus 200 sends an operation command to the selected autonomous vehicle 100 (step S14).

In step S15, the autonomous vehicle 100 (specifically, the operation plan creation part 1031) creates an operation plan on the basis of the operation command it has received. In the case described here, for example, the autonomous vehicle 100 creates an operation plan to the effect that the autonomous vehicle 100 is to travel along the route indicated by the solid arrows in FIG. 5, pick up and drop off a person at node B and node C respectively, and return to node D. The operation plan thus created is sent to the travel control part 1033, and then the operation is started (step S16). Positional information is sent to the server apparatus 200 periodically during the operation also.

While in the above-described case the operation command is created on the basis of a vehicle dispatch request sent from an external source (i.e. a user), the operation command does not necessarily have to be created on the basis of a vehicle dispatch request sent from an external source. For example, the server apparatus 200 may create an operation command autonomously. Moreover, the creation of an operation plan does not necessarily have to be based on an operation command. For example, in cases where an autonomous vehicle 100 performs patrol for the purpose of surveying streets, the autonomous vehicle 100 may create an operation plan without receiving external instructions. Alternatively, an operation plan may be created by the server apparatus 200.

<Operations Under the Presence of an Emergency Report>

Next, the operation of the system in cases where an emergency report has been made will be described.

Firstly, a police force that has received an emergency report sends to the server apparatus 200 an information collection request instead of the vehicle dispatch request in step S11. The information collection request includes an information about the location for which an emergency report was made. This location will be hereinafter referred to as the "reported location".

After receiving the information collection request, the server apparatus 200 (specifically, the emergency report response part 2023) creates an operation command to the effect that an autonomous vehicle 100 is to capture images of a person(s) or a vehicle(s) moving in a direction away from the reported location and determines the autonomous vehicle 100 that is to perform an emergency operation by a process similar to that described above with respect to steps S12 and S13.

The autonomous vehicle 100 that is to perform, the emergency operation can be determined on the basis of the positional information of the autonomous vehicles 100 stored in the server apparatus 200. For example, a vehicle that meets a specific condition may be selected from the autonomous vehicles 100 that are located in a specific area including the reported location. Two or more autonomous vehicles 100 may be selected.

In the case described here, let us assume that node E is the reported location, and an autonomous vehicle 100 located at node B is selected as the autonomous vehicle 100 that is to perform the emergency operation.

Figure 6:
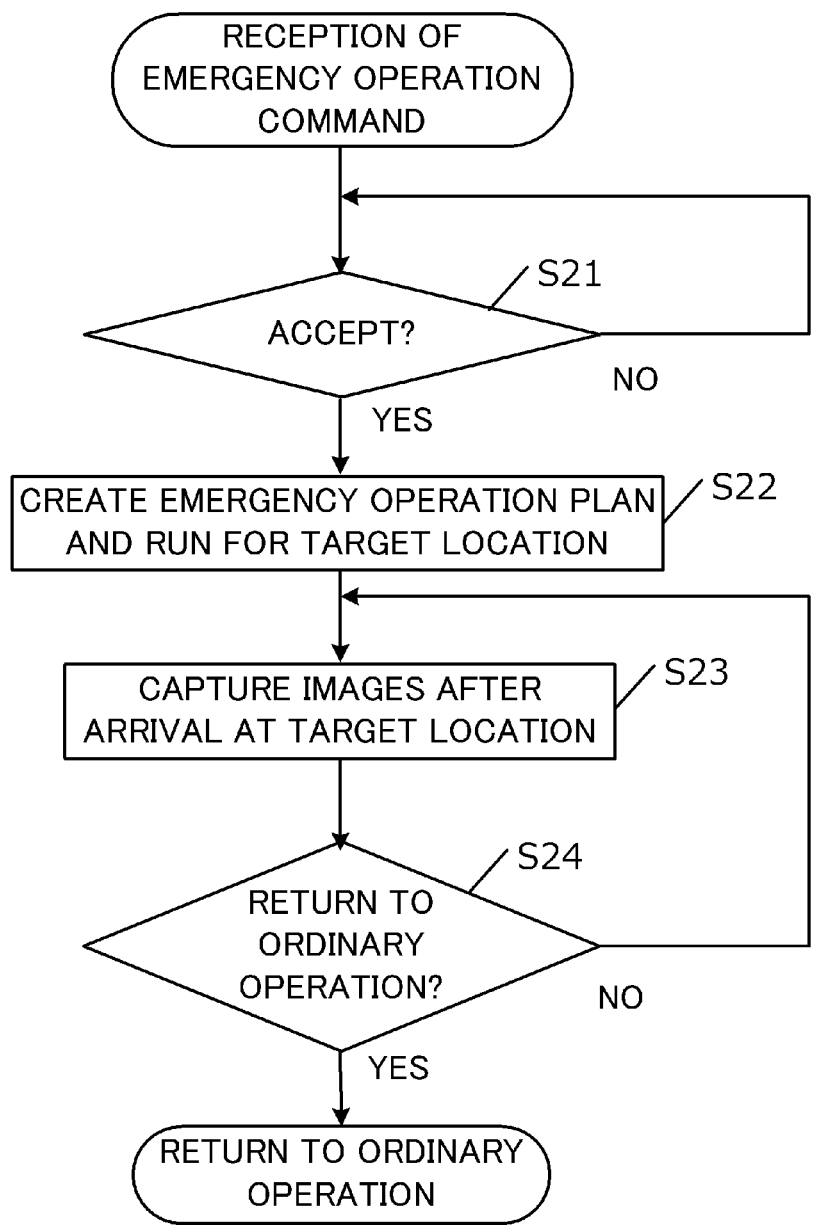
FIG. 6 is a flow chart of a process executed by the autonomous vehicle 100 when performing an emergency operation.

FIG. 6 is a flow chart of a process performed by an autonomous vehicle 100 that has received an emergency operation command.

Firstly, in step S21, it is determined whether or not to accept the emergency operation command. There may be situations in which an autonomous vehicle 100 had better not accept an emergency operation command because of its own emergency. An example of such situations is that the autonomous vehicle 100 is employed by a medical institution and transporting a patient. In such cases, the autonomous vehicle 100 may determine not to accept the emergency operation command. The autonomous vehicle 100 may consult the user on board and accept the emergency operation command only when user's consent is obtained.

In step S22, the autonomous vehicle 100 creates an operation plan (i.e. emergency operation plan) on the basis of the emergency operation command and runs for a destination. The operation that has been performed by the autonomous vehicle 100 is suspended.

The aforementioned destination set in the emergency operation plan will be described below.

In this embodiment, the autonomous vehicle 100 that has received the emergency operation command should capture images of a person or a vehicle(s) moving in a direction away from the reported location. Therefore, in some embodiments the destination may be set to a location in a path starting from the reported location along which the moving person(s) or vehicle(s) is expected to pass. For example, the destination may be set at a certain location in one of the links 1, 2, and 3 starting from the reported location at node E (FIG. 5). If located at such a location, the autonomous vehicle 100 is expected to be able to capture images of the target person or the target vehicle that leaves the reported site.

While only three links 1, 2, and 3 that extend directly from node E are mentioned in the case shown in FIG. 5, there are many paths that start from the reported location. Therefore, it may be desired to narrow down the paths according to a certain condition. For example, a narrowed-down area may be set taking account of the estimated moving speed of the target person or the target vehicle and the time required for the autonomous vehicle 100 to arrive at the destination, and the destination may be set within that area. In cases where there is a choice among a plurality of destinations, the destination may be set to a location in a link with a higher traffic volume (which means easier moving) or, conversely, a location in a link with lower traffic volume (which means fewer potential witnesses).

After arriving at the destination, the autonomous vehicle 100 captures images at that location using the camera 106 (step S23). The captured images may be either still images or moving images. For example, the autonomous vehicle 100 may start capturing a moving image when it comes to a predetermined distance to the reported location. The autonomous vehicle 100 may capture still images or moving images consecutively or continuously over a period through which a moving object is detected. In cases where the autonomous vehicle 100 is equipped with a plurality of cameras 106, the camera 106 that is oriented toward the object in the best way may be selected to be used. In cases where the camera 106 is capable of panning and tilting, the camera 106 may be adjusted to appropriate pan and tilt angles.

The captured images are sent to the server apparatus 200 (specifically, the emergency report response part 2023) and then transferred to the police force.

In step S24, it is determined whether or not to return to the previous operation. Examples of the condition for returning to the previous operation may be, but not limited to, that the number of captured still images reaches a predetermined number, that a predetermined duration of moving image has been captured, that the target person or the target vehicle has been detected, or that returning is allowed by the police force. In the case where there is a user aboard, whether to return to the previous operation may be determined taking into consideration user's intention. When returning to the previous operation, the autonomous vehicle 100 restarts the suspended operation plan. For example, the autonomous vehicle 100 returns to the predetermined route to continue the operation.

As described above, according to the first embodiment, a temporary operation plan is given to an autonomous vehicle 100 under operation to cause it to function as a mobile object that checks up on a person(s) and/or a vehicle(s) that leaves or moves away from the reported location. Thus, it is possible to know the circumstances before dispatching a policeman or the like, enabling proper initial actions to be taken.

Second Embodiment

In the first embodiment, a case in which only one autonomous vehicle 100 accepts an emergency operation command has been described. In the second embodiment, a case in which a plurality of autonomous vehicles 100 accept an emergency operation command will be described.

As shown in FIG. 5, there can be a plurality of road links that start from and extend away from the reported location. Moreover, there are many paths that start from the reported location. In the second embodiment, plurality of autonomous vehicles 100 that have received an emergency operation command are configured to set locations in different links as destinations.

We will discuss an exemplary case, where there are three links 1, 2, and 3 in the paths starting from the reported location at node E (FIG. 5) and there are three autonomous vehicles 100 that can accept an emergency operation command. In that case, the destinations can be set, for example, in the following different manners:

(1) Setting Destinations for Respective Autonomous Vehicles by the Server Apparatus 200

For example, the server apparatus 200 determines the autonomous vehicles 100 to be dispatched to the links 1, 2, and 3 respectively and sends to the autonomous vehicles 100 emergency operation commands that cause them to run to the respective destinations.

(2) Sending Information About the Required Number of Vehicles and a List of Destinations From the Server Apparatus 200

For example, the server apparatus 200 sends an emergency operation command to the effect that three autonomous vehicles 100 that can go to the links 1, 2, and 3 are needed, and autonomous vehicles 100 that have received this emergency operation command determine respective destinations.

(3) Sending Only Information About the Reported Location From the Server Apparatus 200

In this case, an autonomous vehicle 100 Consults map data stored therein to run to one of the links 1, 2, and 3.

In the case where the above method (2) or (3) is employed, it is necessary for a plurality of autonomous vehicles 100 to coordinate the destinations with each other. For this purpose, for example, the autonomous vehicles 100 may perform consultation with each other by inter-vehicle communication. Alternatively, an autonomous vehicle 100 that has determined its destination earlier may send the determined result, and other autonomous vehicles 100 may determine their own destinations in conformity with that result.

While the second embodiment has been described with reference to FIG. 5, there are a myriad of destinations to which autonomous vehicles 100 can run in actual road networks. Therefore, it may be desired that the area within which destinations are to be set be narrowed down according to a certain condition, as described above.

As described above, in the second embodiment, different autonomous vehicles 100 are dispatched to a plurality of road links through which the target person or the target vehicle may possibly pass. This mode can increase the probability of capturing images of the target person or the target vehicle.

While the destinations are set as road links that extend directly from the reported location in the above-described, the destinations may be set as locations in a plurality of different paths starting from the target location.

Third Embodiment

In the third embodiment, the autonomous vehicle 100 acquires information about features of a target person or a target vehicle and detects the target person or the target vehicle using captured images.

Figure 7:
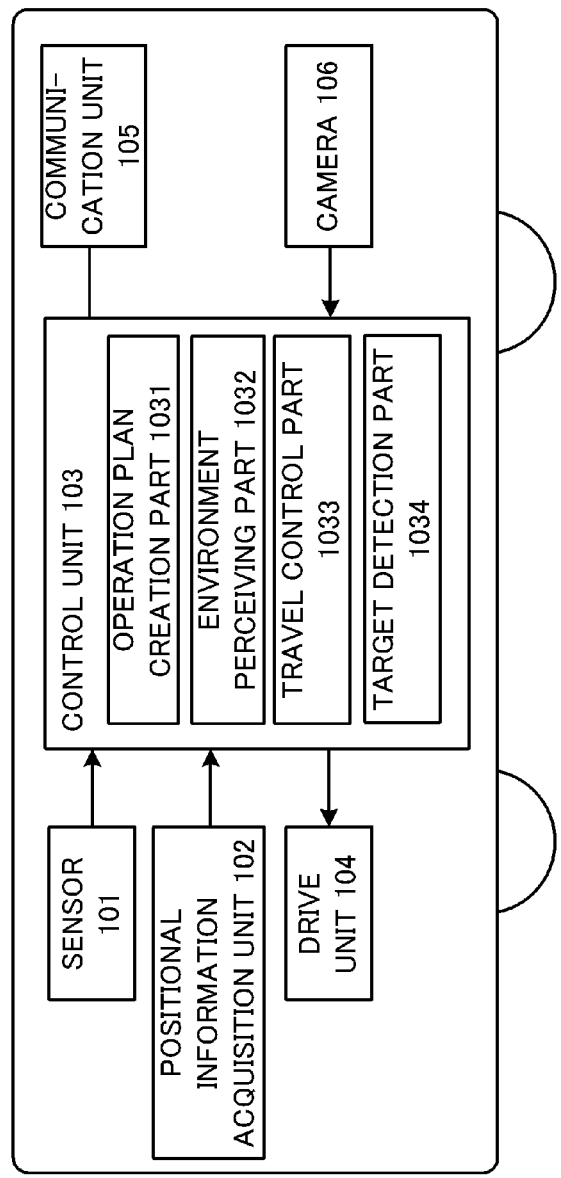
FIG. 7 is a block diagram showing the configuration of an autonomous vehicle 100 according to a third embodiment.

FIG. 7 is a block diagram showing the general configuration of the autonomous vehicle 100 according to the third embodiment. The configuration of the server apparatus 200 according to the third embodiment is not shown in FIG. 7, because it is the same as that shown in FIG. 2. In the third embodiment, the operation command creation part 2022 of the server apparatus 200 (FIG. 2) acquires information about features of a target person or a target vehicle (which will be hereinafter referred to as "feature information") and creates an emergency operation command containing the feature information.

The autonomous vehicle 100 (FIG. 7) has a target detection part 1034, which detects an object having matching features using images captured by the camera 106. The feature information may be any types of information that enables detection using information captured by the camera. For example, in the case where the target is a person, the feature information may include information about facial feature values, body build, facial features, and/or clothes. In the case where the target is a vehicle, the feature information may include information about the vehicle model, color, and/or license plate. The detection of the target may be carried out using a known method.

As described above, according to the third embodiment, the autonomous vehicle 100 located at a specific location detects the target among passing-by persons or passing-by vehicles on the basis of the feature information. The result of detection is sent to the server apparatus 200 with an image(s). This mode enables discovery of the target at an early stage.

Modification of Third Embodiment

If an autonomous vehicle 100 detects the target person or the target vehicle, the autonomous vehicle 100 may share the information with other autonomous vehicles 100 present in the neighborhood. The information may be shared through either communication via the server apparatus 200 or direct inter-vehicle communication. The autonomous vehicles 100 may be relocated based on that information.

The reported location associated with the emergency operation command may be updated by the location at which the target is detected. For example, the autonomous vehicle 100 having detected the target may inform the server apparatus 200 of the positional information of the location of detection, and then the server apparatus 200 may re-create and send an emergency operation command with the updated reported location on the basis of the positional information. The autonomous vehicles 100 can be relocated by this method also.

According to this modification, the autonomous vehicles 100 are relocated about the place at which the target is located, so that the current position of the target can be narrowed down with improved accuracy.

Fourth Embodiment

In the fourth embodiment, pursuit of the detected target person or vehicle is further performed in addition to the operation according to the third embodiment.

Figure 8:
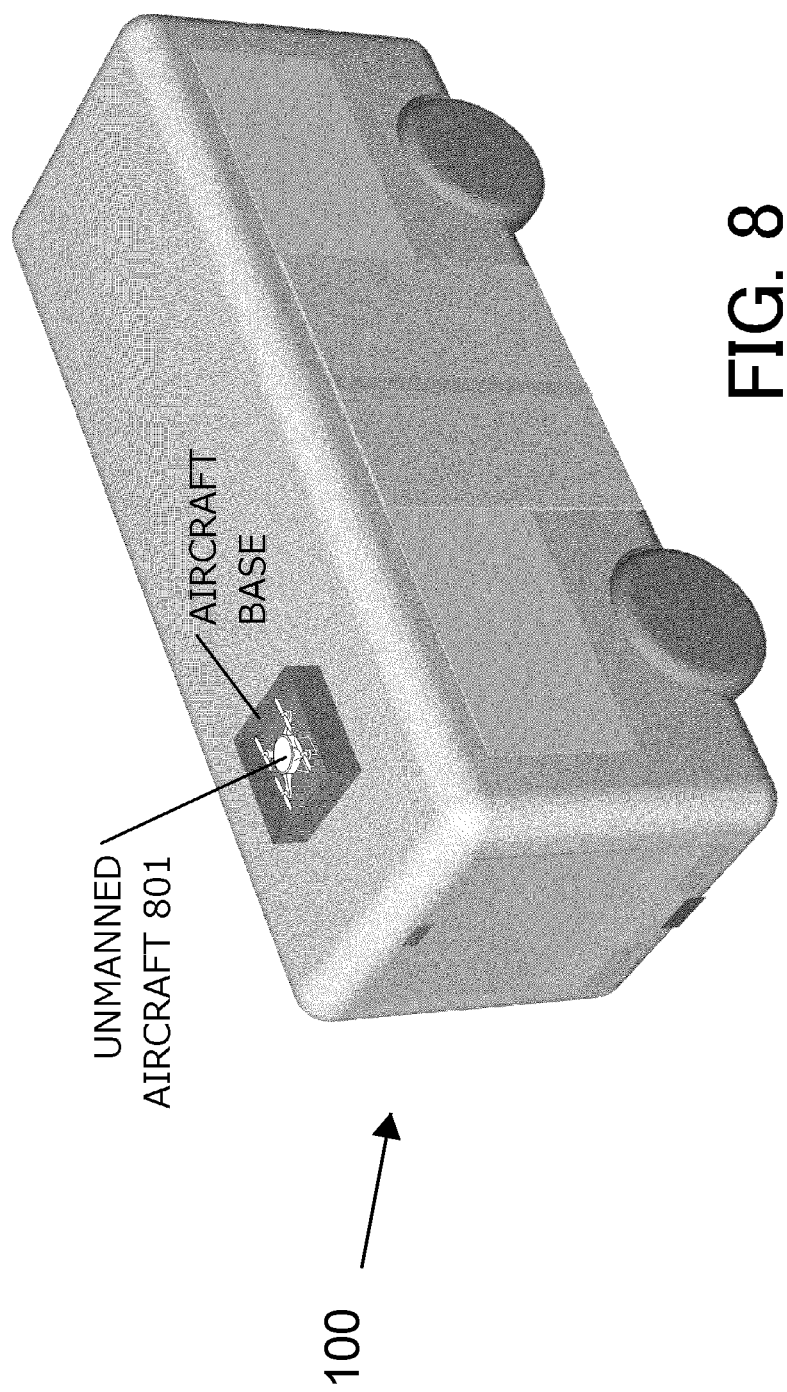
FIG. 8 shows the outer appearance of an autonomous vehicle according to a fourth embodiment.

The autonomous vehicle 100 according to the fourth embodiment is provided with a battery-powered unmanned, aircraft 801 equipped with a camera as shown in FIG. 8. The unmanned aircraft 801 is capable of sending images captured by its camera to the autonomous vehicle 100. The unmanned aircraft 801 can be charged on an aircraft base provided on the autonomous vehicle 100.

In the fourth embodiment, after the target detection part 1034 detects the target, the flight of the unmanned aircraft 801 is started. Images captured by the unmanned aircraft 801 are sent to the target detection part 1034 by wireless communication. The target detection part 1034 controls the flight of the unmanned aircraft 801 in such a way as to continuously capture the target found by the camera 106 in the frame of the camera of the unmanned aircraft 801. The image captured by the camera of the unmanned aircraft 801 may be relayed to the server apparatus 200. The positional information of the unmanned aircraft 801 may also be sent to the server apparatus 200 successively or continuously.

According to this mode, it is possible to continue pursuit of the target person or the target vehicle without being affected by traffic conditions.

When the unmanned aircraft 801 is separated from the autonomous vehicle 100 by more than a certain distance during the pursuit, the autonomous vehicle 100 may move to follow the unmanned aircraft 801.

Modification of Fourth Embodiment

In the fourth embodiment, the length of time over which pursuit of the target can be performed depends on the remaining capacity of the battery of the unmanned aircraft 801. When it is detected that the remaining battery capacity of the unmanned aircraft 801 becomes low, the autonomous vehicle 100 may request assistance of another autonomous vehicle 100 equipped with an unmanned aircraft so as to ask it to take over the pursuit.

Figure 9:
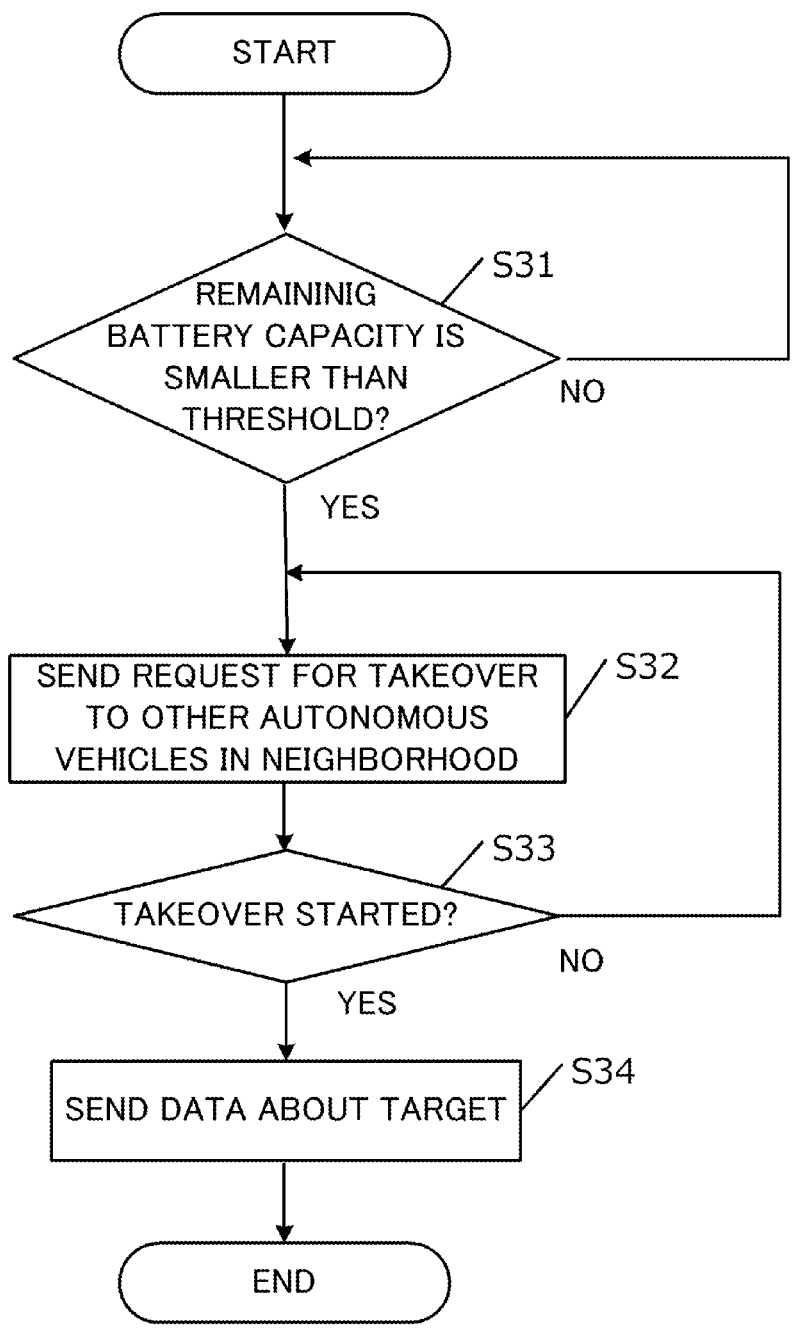
FIG. 9 is a flow chart of a process executed when performing takeover of pursuit according to the fourth embodiment.

FIG. 9 is a flow chart of a process executed by the target detection part 1034 during pursuit using the unmanned aircraft 801.

Firstly in step S31, it is determined whether or not the remaining battery capacity (or remaining flight time) of the unmanned aircraft 801 is smaller than a threshold. If the remaining capacity is smaller than the threshold, the target detection part 1034 sends a request for takeover of pursuit to an autonomous vehicle 100 that is present in the neighborhood (step S32). The request for takeover may be sent either communication via the server apparatus 200 or direct inter-vehicle communication.

The determination as to whether or not to accept the request for takeover may be made, for example, in the same manner as in the above-described step S21.

If an autonomous vehicle 100 having received the request accepts to take over the pursuit in step S33, the target detection part 1034 sends data about the target to be pursued (S34) and causes the unmanned aircraft 801 to return. The data about the target to be pursued may be any information that enables takeover of the pursuit. Examples of the data about the target include information about the current location of the unmanned aircraft 801, information about the current location of the pursued target, and information about features of the pursued target.

The takeover may be carried out by replacing the autonomous vehicle 100 itself or replacing only the unmanned aircraft 801.

According to this modification as described above, the pursuit can be continued regardless of the remaining battery capacity, if the takeover can be done.

Modifications

The above-described embodiments are merely exemplary modes, to which modifications can be made without departing from the essence of the present disclosure.

In the above-described embodiments, the autonomous vehicle 100 arriving at the destination performs image capturing automatically. The moving image captured by the camera 106 may be relayed to the server apparatus 200 on a real-time basis.

While in the above-described embodiments the autonomous vehicle 100 arriving at the destination captures images automatically, the autonomous vehicle 100 may be configured to allow remote control. For example, the autonomous vehicle may be configured to allow remote control of image capturing, monitoring, and/or adjustment of the position and angle of the camera. Such remote control enables more refined operation.

What is claimed is:

1. An information collection system comprising one or more autonomous mobile objects and a server apparatus, the autonomous mobile object comprising:
   an imaging unit configured to capture an image;
   a positional information sender configured to acquire positional information and send it to the server apparatus; and
   an operation controller configured to cause the autonomous mobile object to move autonomously on the basis of an operation command; and
the server apparatus comprising:
   a storage unit configured to receive the positional information from the autonomous mobile object and store it;
   a commander configured to send the operation command to the autonomous mobile object;
   a receiver configured to receive information relating to an emergency report including information about a target location; and
   a control unit configured to determine a destination extending from the target location where a person or a vehicle moving away from the target location is expected to pass,
   wherein when the receiver of the server apparatus receives the information relating to an emergency report, the commander sends an emergency operation command to at least one autonomous mobile object that is located in a specific area including the target location, the emergency operation command being a command that causes the autonomous mobile object to capture an image of the person or the vehicle that is moving in a direction away from the target location by causing the autonomous mobile object to proceed to the destination determined by the control unit, and the autonomous mobile object sends the image captured according to the emergency operation command to the server apparatus, and
   wherein when the autonomous mobile object detects the person or the vehicle at a second location away from the target location, the target location is set to the second location and the server apparatus creates an updated emergency operation command including the target location as the second location and the commander sends the updated emergency operation command to the one or more autonomous mobile objects causing the one or more autonomous mobile objects to proceed to the second location.

2. An information collection system according to claim 1, wherein
   if the autonomous mobile object receives the emergency operation command while operating on the basis of a first operation command, the autonomous mobile object suspends the operation based on the first operation command.

3. An information collection system according to claim 1, wherein
   the emergency report is a report of a suspicious person or a suspicious vehicle, the emergency operation command includes information about features of the suspicious person or suspicious vehicle, and the autonomous mobile object detects an object having the features.

4. An information collection system according to claim 3, wherein the autonomous mobile object is provided with an aircraft having a camera and pursues the object using the aircraft.

5. An information collection system according to claim 4, wherein
   when the remaining flight time of the aircraft becomes smaller than a predetermined length of time, a second autonomous mobile object other than the autonomous mobile object takes over the pursuit, and a second aircraft that the second autonomous mobile object has continues the pursuit.

6. An information collection system according to claim 1, wherein
   the emergency operation command is a command that invites two or more autonomous mobile objects respectively to locations in different paths that start from the target location.

7. An information collection system according to claim 1, wherein
   the autonomous mobile object sends the image to the server apparatus on a real-time basis while operating on the basis of the emergency operation command.

8. A server apparatus that communicates with an autonomous mobile object that has an imaging unit and moves autonomously on the basis of an operation command, comprising:
   a storage unit configured to receive positional information from the autonomous mobile object and store it;

a commander configured to send the operation command to the autonomous mobile object;

a receiver configured to receive information relating to an emergency report including information about a target location; and a control unit configured to determine a destination extending from the target location where a person or a vehicle moving away from the target location is expected to pass, wherein when the receiver receives the information relating to an emergency report, the commander sends an emergency operation command to at least one autonomous mobile object that is located in a specific area including the target location, the emergency operation command being a command that causes the autonomous mobile object to capture an image of the person or the vehicle that is moving in a direction away from the target location by causing the autonomous mobile object to proceed to the destination determined by the control unit, and wherein when the autonomous mobile object detects the person or the vehicle at a second location away from the target location, the target location is set to the second location and the server apparatus creates an updated emergency operation command including the target location as the second location and the commander sends the updated emergency operation command to the autonomous mobile object causing the autonomous mobile object to proceed to the second location.

\* \* \* \* \*